May 11, 1948.  A. R. HOWELL  2,441,488
CONTINUOUS COMBUSTION CONTRAFLOW GAS TURBINE
Filed Jan. 31, 1945  4 Sheets-Sheet 2
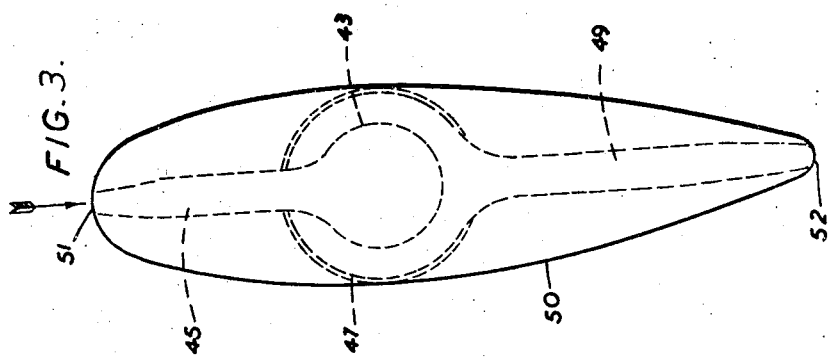
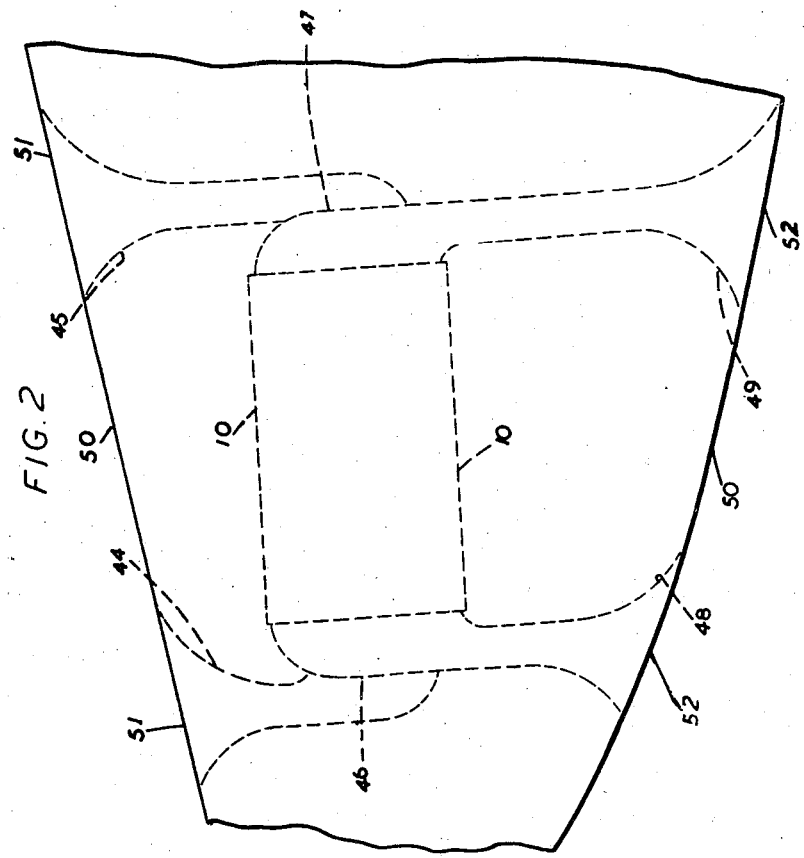
Inventor
Alven Reymond Howell
By
Loyd Hall Sutton
Attorney

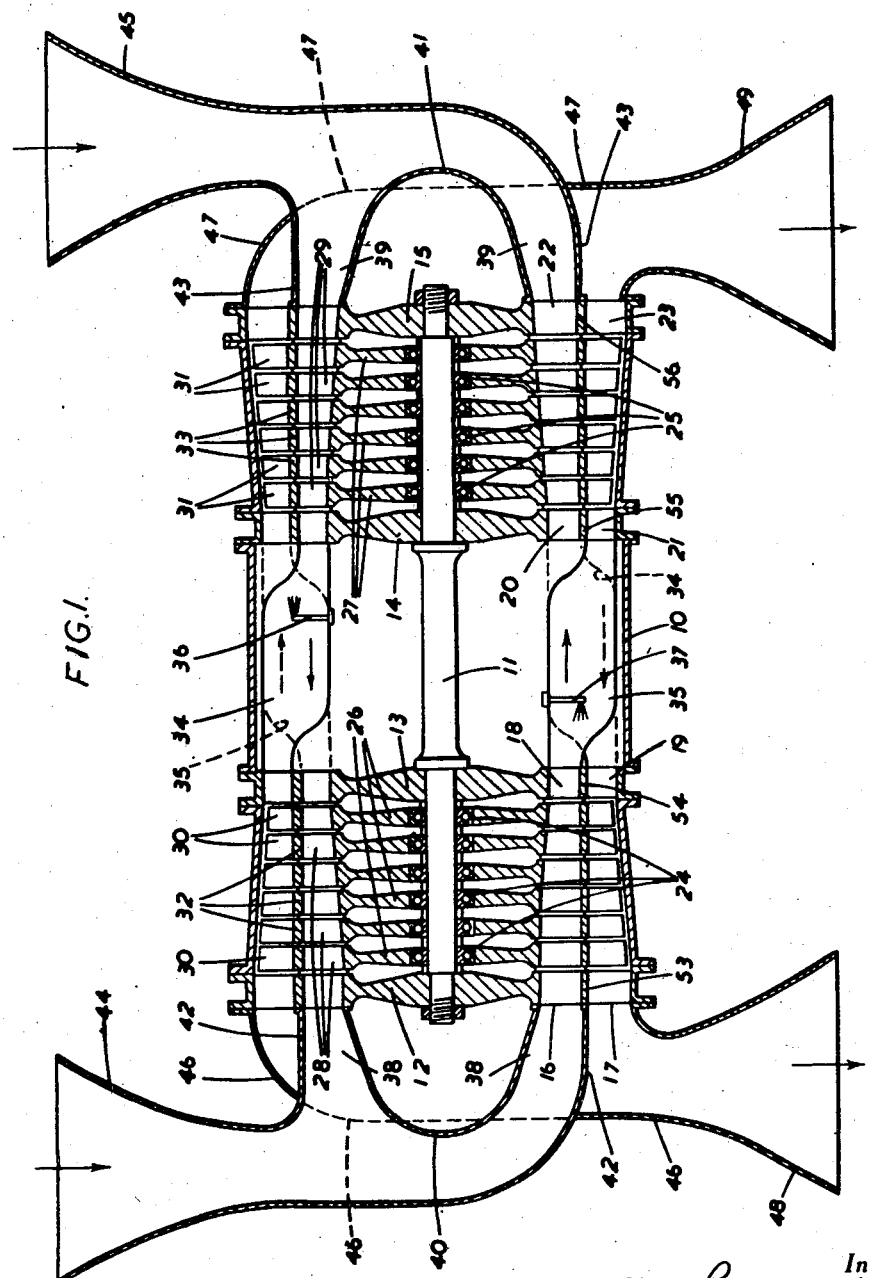

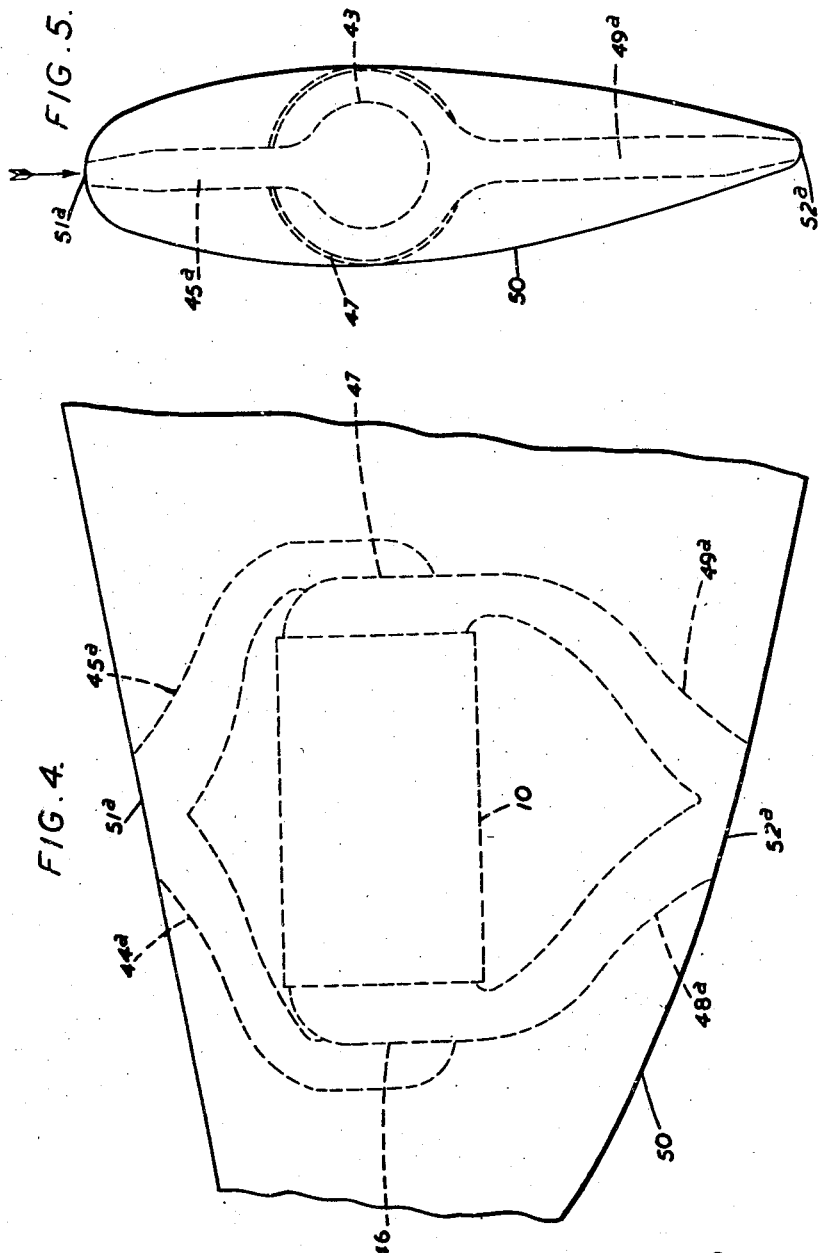

May 11, 1948.   A. R. HOWELL   2,441,488
CONTINUOUS COMBUSTION CONTRAFLOW GAS TURBINE
Filed Jan. 31, 1945   4 Sheets-Sheet 4

Inventor
Alwyn Raymond Howell
By
Stevens Davis & Miller
his Attorneys

Patented May 11, 1948

2,441,488

UNITED STATES PATENT OFFICE 2,441,488

CONTINUOUS COMBUSTION CONTRAFLOW GAS TURBINE

Alun Raymond Howell, Neath, England, assignor to Power Jets (Research and Development) Ltd., London, England, a British company Application January 31, 1945, Serial No. 575,536
In Great Britain January 31, 1944

5 Claims. (Cl. 60—35.6)

This invention relates to internal combustion turbine power plants of the kind in which air is compressed in compressor means, delivered to combustion chamber means, into which fuel is injected and continuously burnt at constant pressure and then expanded to a lower pressure in turbine means, and wherein the turbine and compressor means are of the axial flow type.

More especially the invention contemplates the installation of power plants of this kind as aircraft prime movers, although the invention is not limited to power plants intended for this particular application.

An object of the invention is provision of a power plant of the kind above referred to, of highly compact and symmetrical construction, and providing substantially straight-through flow channels for the working fluid from the intake end of the compressor means, through the latter and the combustion chamber means, and then through the turbine means to the outlet end thereof without reversals or substantial changes of direction of flow.

A further object of the invention is to provide a power plant of the kind first herein referred to, in which reduction of axial length is attained by nesting the turbine and compressor means coaxially within one another, other objects being the elimination of torque reactions on the fixed structure and of shafting carrying heavy torque loads.

Yet another object of the invention is the provision of a power plant of the kind first herein referred to, especially adapted for installation within the contours of an aircraft wing and providing conveniently for the delivery of exhaust gases to one or two propulsive jet reaction nozzles as may be required.

The power plant according to this invention is also adapted for furnishing two independent streams of turbine exhaust gas for further expansion in two separate exhaust turbines, which may be coupled to any type of external load.

How these objects and others as will hereinafter appear are attained and in what manner the invention may be performed will be understood from the following description, given by way of example and having reference to the accompanying drawings, of an embodiment of the invention, the scope of which is defined in the appended claims.

In the drawings:

Figure 1 is an axial plan section, in part diagrammatic, of an internal combustion turbine unit adapted for jet propulsion of an aircraft.

Figure 2 is a diagrammatic plan view of its installation in an aircraft wing.

Figure 3 is a diagrammatic chordwise cross-sectional view of the showing of Figure 2.

Figures 4 and 5 are views similar to Figures 2 and 3 respectively, illustrating a modified arrangement.

Figure 6:
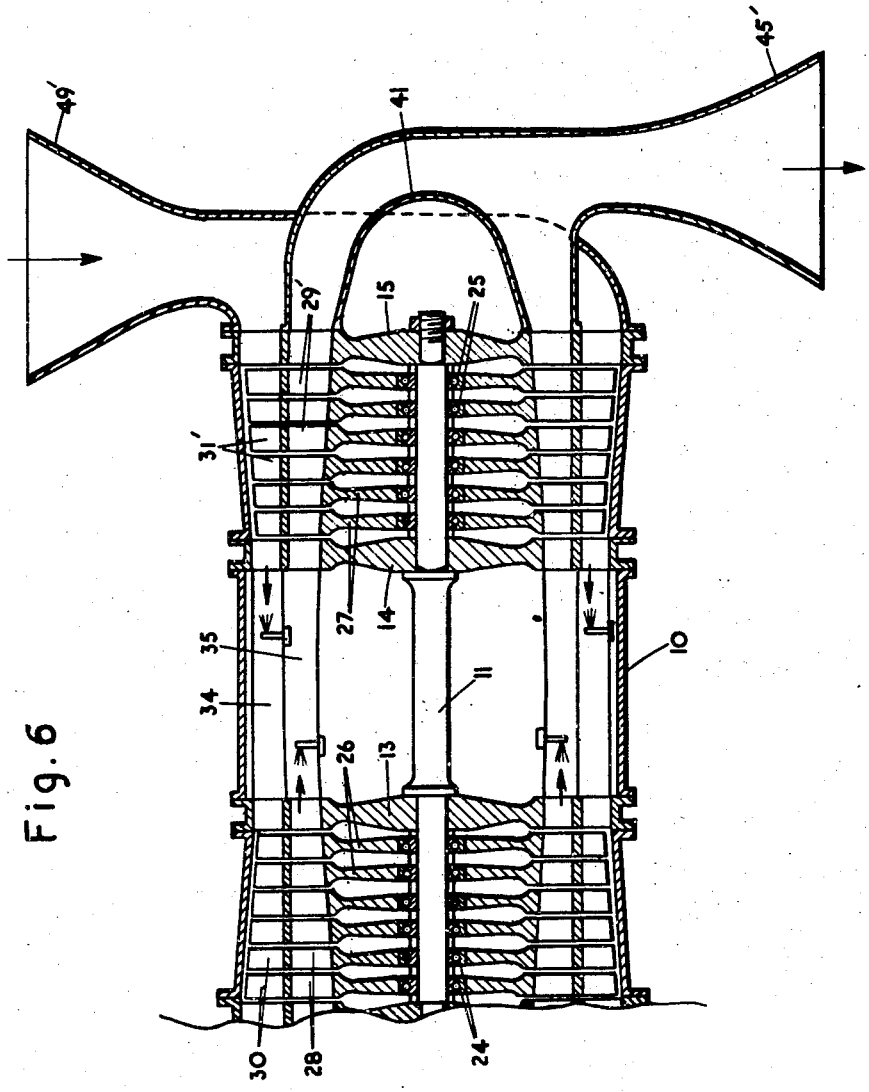
Figure 6 is a fragmentary view, similar to Figure 1, illustrating a modification of the right-hand end of the unit of Figure 1.

In the example illustrated in Figure 1, a non-compounded duplex turbo-compressor unit comprises two identically similar axial flow turbo-compressor components arranged coaxially end to end within a fixed casing 10. A fixed axle 11 (concentric with casing 10) carries diaphragms 12, 13, 14, 15 axially spaced thereon. These diaphragms are connected to the casing 10 by sets of radial webs 16, 17; 18, 19; 20, 21 and 22, 23 respectively. Intermediate the inner and outer sets of webs are continuous rings 53, 54, 55, 56, formed integrally with the web pairs 16, 17; 18, 19; 20, 21 and 22, 23 respectively.

The diaphragms 13, 14 and their associated webs and rings define the inner ends of the two turbo-compressor components whose outer ends are likewise defined by the diaphragms 12, 15 and their associated webs and rings.

Intermediate the diaphragms 12, 13 are a number of turbo-compressor rotor wheels 26, independently mounted for rotation on the axle 11 by means of bearings 24 and each carrying a single row of two-tier turbo-compressor blading 28, 30. The inner blade parts 28 are formed as compressor blades and the outer parts 30, as turbine blades. Intermediate the inner and outer blade parts each blade has an integrally formed shroud portion 32; in the complete assembled wheel these shroud elements constitute a complete ring and the several rings so formed have small clearances from the adjacent rings and/or the fixed rings 53, 54 and thereby constitute a partition in the form of a surface of revolution separating the (outer) turbine duct from the (inner) compressor duct. Gland means (not shown in detail) are provided to seal the said clearances. These ducts are concentric and annular, the outer boundary of the turbine duct being constituted by the casing 10 and the inner boundary of the compressor duct by the flanged rims of the rotor wheels 26 and of the diaphragms 12, 13, said rims being arranged with small clearances so as to present a practically continuous boundary, formed as a surface of revolution. The pitch of alternate sets of blading, both compressor and turbine, is of opposite hand, whereby alternative rotor wheels 26 counter-rotate.

The arrangement of the second turbo-compressor component is exactly similar, and comprises bearings 25, rotor wheels 27 and two-tier blading 29, 31, 33.

Intermediate the two turbo-compressor components are arranged a circumferentially spaced set of combustion chambers 34, 35 which communicate with the inner ends of the annular turbine and compressor ducts.

Alternative combustion chambers 34 communicate with the compressor duct of the right hand component (as seen in the drawing) and with the turbine duct of the left hand component. Conversely the intermediate combustion chambers 35 communicate with the compressor and turbine ducts of the left hand and right hand components respectively.

The combustion chambers 34, 35 are provided with fuel injection nozzles 36, 37 and the directions of flow of the working fluid therethrough are indicated by arrows.

The end diaphragms 12, 15 support domed fairings 40, 41 and the rings 53, 56, support generally cylindrical fairings 42, 43 which together define annular inlet ducts leading to the compressor ducts, the fairings 42, 43 being continuous with air intake scoops 44, 45. Flattened dome shaped members 46, 47 are attached to and from the end closures of the casing 10. The cylindrical fairings 42, 43 pass through the domed end members 46, 47 and the annular spaces between the elements 42, 46 and between elements 43, 47 receive the exhausts of the turbines and discharge them into pipes 48, 49 leading to propulsive jet nozzles. The directions of flow of air into the intakes and of exhaust from the jet nozzles are shown by arrows.

Besides their structural function the webs 16, 22 serve as entry guide vanes to the compressors and similarly the webs 18, 20 serve as compressor exit guide vanes. Likewise webs 17, 23 and 19, 21, serve respectively as exit and entry guide vanes to the turbines.

It will be seen that in this arrangement the working fluid flows straight through the whole unit from end to end without reversal of direction, although each turbo-compressor component operates on the contra-flow principle, the flow being inwards through the compressors and outwards through the turbines; this is achieved by arranging the combustion chambers to crossover alternatively, so that the compressor of each turbo-compressor component feeds the turbine of the other component.

In the arrangement illustrated the turbo-compressor rotors are not coupled to any external load, the power delivered by the turbines being wholly absorbed in driving the compressors and the whole of the residual power in the turbine exhausts is utilised for producing thrust by means of jet nozzles.

How such a power unit can be installed within a thick section aeroplane wing is shown in Figures 2 and 3 wherein the wing profile in plan and section is indicated at 50. The intake and jet openings shown at 51, 52 respectively, being flattened in the vertical direction (see Figure 3), are expanded into a trumpet shape in the horizontal plane (see Figure 2). In this installation two intakes and two jet nozzles are employed as shown.

Figures 4 and 5 show a modified arrangement employing a single opening 51a feeding a branched intake 44a, 45a, and a single jet nozzle 52a fed by a branched jet pipe 48a, 49a.

In a modified arrangement illustrated in Figure 6 it is envisaged that the right hand half of the apparatus of Figure 1 is rotated through 180° about its horizontal axis so that pipe 49' is now an entry instead of an exit, the exit being indicated by 45', the turbo-compressor components being dissimilar in that one (the left hand half) has the annular compressor duct enclosing blades 28 within the annular turbine duct enclosing blades 30, while the other component (the right hand half) has the opposite arrangement with blades 31' now acting as compressor blades and blades 29' now acting as turbine blades. With this arrangement circumferentially spaced tubular combustion chambers 34, 35 can be used which are individually symmetrical with regard to the relative location of their entries and exits but they are arranged in two concentric series or instead of the resulting two rows of circumferentially spaced tubular combustion chambers, two annular concentric combustion chambers may be employed.

What I claim as my invention and desire to secure by Letters Patent is:

1. An internal combustion turbine power plant operating on the constant pressure cycle with continuous flow; including two axially spaced coaxial flow turbine-compressor assemblies, each assembly comprising means defining coaxial compressor and turbine annular flow channels, one nested within the other, and common rotor means carrying compressor and turbine blading operative respectively in one and the other of said channels, the blading and the cross sectional areas of the channels being arranged for contraflow with the inlet ends of the turbine flow channels of the two assemblies facing one another; together with at least two combustion chambers interconnecting the two turbine-compressor assemblies, being disposed circumferentially about their common axis and intermediate the said assemblies, in such a manner as to provide a flow channel from the compressor flow channel of one assembly, through one combustion chamber to the turbine flow channel of the other assembly and similarly from the compressor flow channel of the last named assembly through the other combustion chamber to the turbin flow channel of the first named assembly.

2. A constructional form of the power plant as claimed in claim 1 in which the two turbine-compressor assemblies are similar, the compressor flow channels being within the turbine flow channels, and a number of similar combustion chambers are circumferentially spaced symmetrically about the axis, each combustion chamber having an inlet and an outlet respectively positioned to register with the compressor and turbine annular flow channels and alternate combustion chambers having their inlet and outlet ends reversed with respect to one another.

3. A power plant as claimed in claim 1, wherein the rotor blading comprises rows of two-tier blades having inner compressor blade portions and outer turbine blade portions separated by integral shrouding elements, which, when the rotor means are completely assembled, consitute shroud ring means separating the turbine flow channel from the compressor flow channels.

4. A power plant as claimed in claim 1, wherein the rotor means comprise a number of independently rotatable, coaxial rotor elements arranged in tandem, each carrying a row of two-tier blades having inner compressor blade portions and outer turbine blade portions separated by integral shroud elements, which when the whole is assembled constitute a number of closely spaced shroud rings together forming a substantially continuous boundary between the turbine and compressor flow channels, and wherein the bladings of adjacent rotor elements are opposite handed, whereby adjacent rotor elements counter-rotate.

5. A power plant as claimed in claim 1, having duct forming elements at each end of the power plant constituting air intake collector ducts delivering to the intake ends of the compressor flow channels and other duct forming means at each end of the power plant constituting exhaust collector ducts receiving exhaust gas from the turbine flow channels, the said intake collector ducts terminating in at least one forwardly facing air intake opening and the exhaust collector ducts terminating in at least one rearwardly facing jet reaction nozzle, said arrangement of ducts particularly adapting the power plant for installation as an aircraft prime mover.

ALUN RAYMOND HOWELL.